No. 12,017. Reissued July 22, 1902.

F. WICKS.

METAL PUMP FOR TYPE CASTING.

(Application filed June 11, 1902.)

3 Sheets—Sheet 1.

Witnesses

Geo. Mung

Geo. Wm. Snyder Jr.

By

Inventor

Frederick Wicks

Alexander Ramsay

Attorneys

No. 12,017. Reissued July 22, 1902.

F. WICKS.

METAL PUMP FOR TYPE CASTING.

(Application filed June 11, 1902.)

3 Sheets—Sheet 2.

Inventor

Frederick Wicks

Witnesses

By

Attorneys

No. 12,017. Reissued July 22, 1902.

F. WICKS.

METAL PUMP FOR TYPE CASTING.

(Application filed June 11, 1902.)

3 Sheets—Sheet 3.

Witnesses

Jno. Ampie

Geo. H. Graydon Jr.

By

Inventor

Frederick Wicks

Clemens & Clemens

Attorneys

UNITED STATES PATENT OFFICE.

FREDERICK WICKS, OF ESHER, ENGLAND.

METAL-PUMP FOR TYPE-CASTING.

SPECIFICATION forming part of Reissued Letters Patent No. 12,017, dated July 22, 1902.

Original No. 669,405, dated March 5, 1901. Application for reissue filed June 11, 1902. Serial No. 111,208.

*To all whom it may concern:*

Be it known that I, FREDERICK WICKS, a citizen of England, residing at Halfway Lodge, Esher, in the county of Surrey, England, have invented a certain new and useful Improvement in Metal-Pumps for Type-Casting, (for which I have applied for a patent in Great Britain, dated February 23, 1899, No. 4,052,) of which the following is a specification.

This invention, which was originally included in my copending application filed September 14, 1899, Serial No. 730,476, relates to certain new and useful improvements in pumps to be used in connection with type-casting apparatus such as described in my United States Letters Patent No. 565,820, dated August 11, 1896, and has for its object to provide in a pump the novel combination and arrangement of parts hereinafter described, and more particularly pointed out in the claims following this specification.

Figures 1, 2, 3:
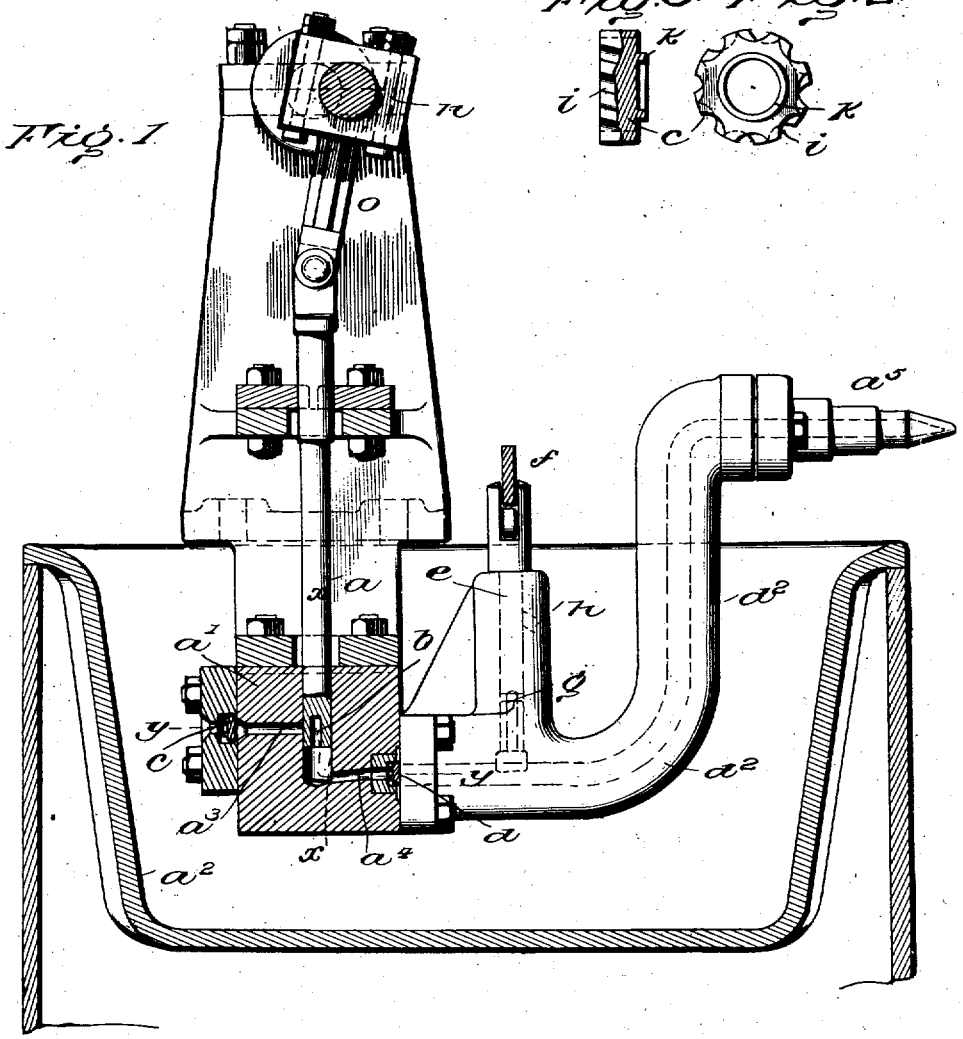
Figure 4:
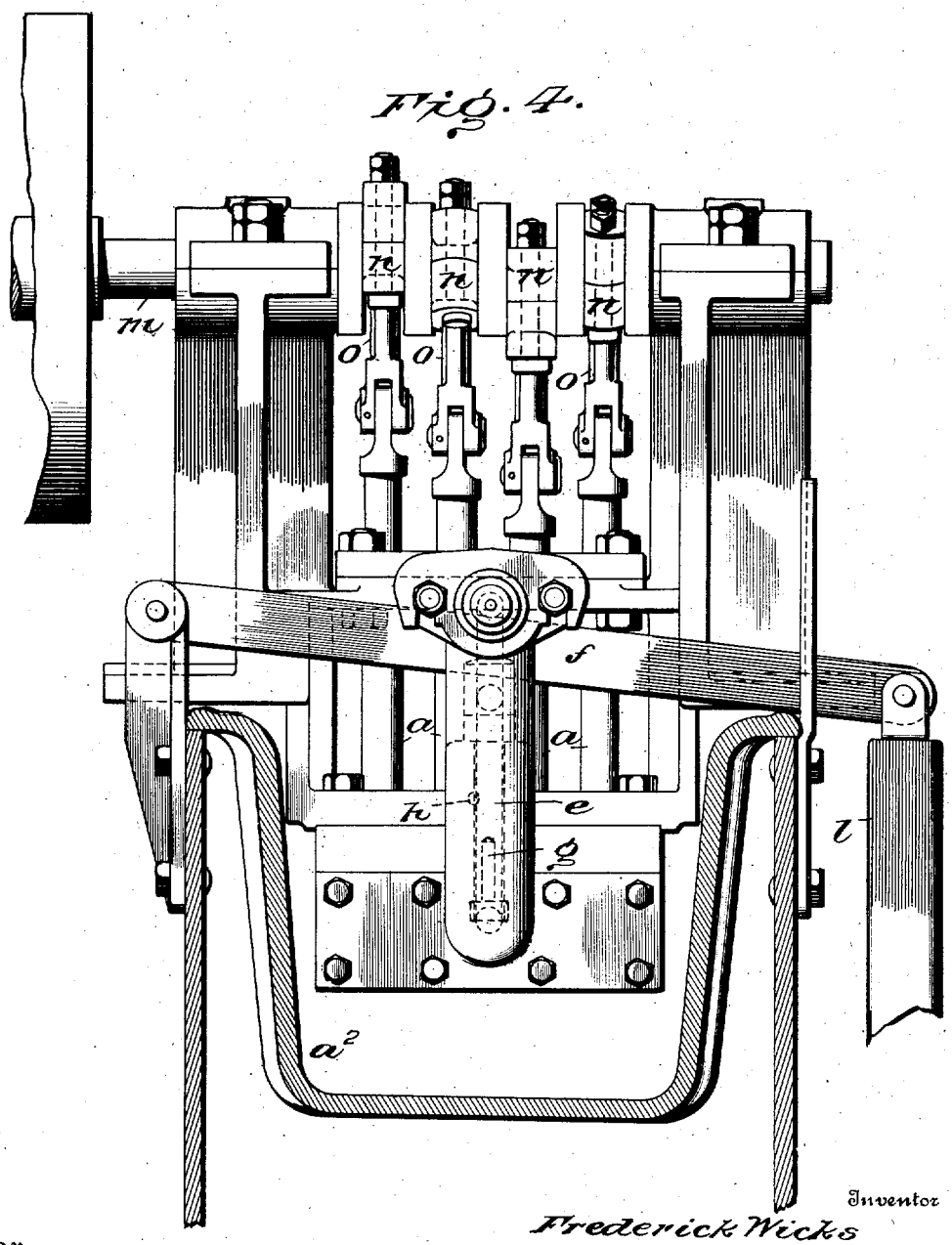
Figure 5:
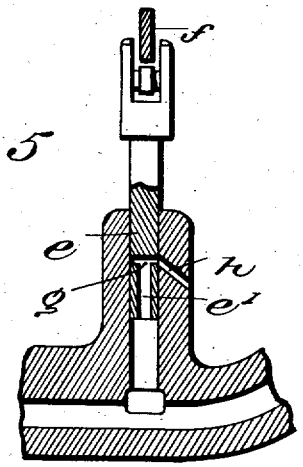
Figure 6:
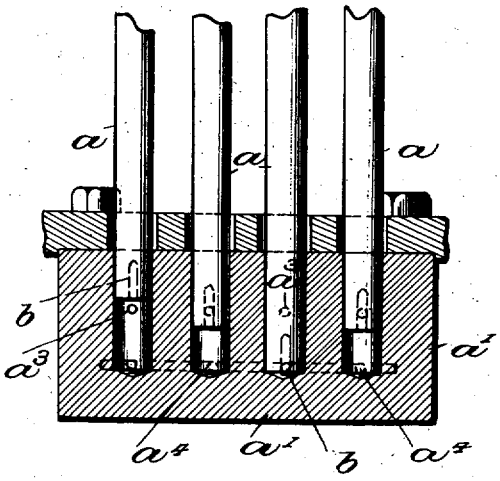
Figure 7:
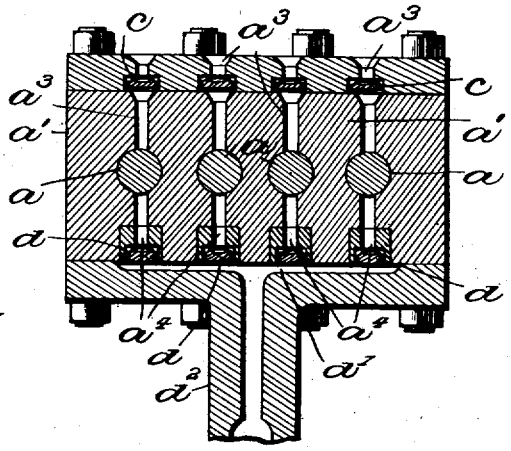

In the annexed drawings, illustrating the invention, Figure 1 is a vertical section of one of the pumps for injecting the molten metal into the molds. Figs. 2 and 3 are respectively a front and a side view of one of the disk valves drawn to an enlarged scale. Fig. 4 is a front view showing the range or pumps, the metal-pot being shown in section. Fig. 5 is a detailed sectional view of the relief-valve. Fig. 6 is a part vertical section taken on the line $x\,x$ of Fig. 1. Fig. 7 is a sectional plan taken on the line $y\,y$ of Fig. 1, passing through the inlet-valves $c$, down the center of the pump, and thence through the discharge-valves $d$.

The working pump constituting the essential feature of this invention, and which will now be described in detail, consists, preferably, of four plungers arranged at equal distances apart on a common shaft, as clearly illustrated in Fig. 4, each of which is provided at its lower end with a cavity constituting an air-cushion within each plunger, an inlet and an outlet disk valve placed in particular relation to the plungers, a plurality of cylinders for the plungers wherein the molten metal is received and discharged, and a relief-valve arranged to preserve a continuous and uniform projection of the metal through a small orifice in the delivery-nozzle.

In the drawings, Fig. 1, the letter $a$ indicates one of the pump-plungers, in the lower end of which is formed a cavity $b$, constituting an air-cushion to prevent shock when the plunger makes its downstroke. The plungers each operate within a cylinder, which in the present instance consists of a block $a'$, of metal, provided with a plurality of openings each constituting a cylinder for its plunger, and wherein the molten metal is received and discharged, said cylinder being located within the melting-pot $a^2$. The molten metal flows into the cylinders through separate inlet-passages $a^3$ and discharges through outlet-passages $a^4$, which latter are located at the bottom of the cylinders, while the former are located at a suitable distance above the outlet-passages and at a point just below the highest position the plungers assume in ascent. In the inlet-passages $a^3$, leading from the pot into the cylinders, and in the outlet-passages $a^4$, leading from the cylinders to the nozzle $a^5$, I provide disk valves $c$ and $d$, respectively, each valve having cut or formed in its periphery or circumference obliquely-arranged notches $i$, through which the metal flows, thus causing said valves to rotate. On the face of each valve is provided a slightly-projecting eccentrically-arranged circular rib $k$, which seats against the side of the valve-chamber, as shown, it being understood that the valves are arranged on edge. These ribs being somewhat eccentric, as shown, as each valve rotates it does not always come to rest or seat upon the same place. The outlet-passages $a^4$ all open into a common passage $d'$, formed in the block within which the cylinders are located, and from this common passage leads the nozzle-pipe $d^2$, all as clearly illustrated in Fig. 7 of the drawings. Near the outlet-valves $d$ and communicating with the nozzle-pipe $d^2$ I have provided a relief-valve, consisting of a plunger $e$, weighted or loaded to a predetermined pressure by a weight $l$ on a lever $f$, as shown in Fig. 4. The said plunger $e$ is provided in its end with a central bore $e'$ and has an intersecting cross-bore forming a passage $g$, which when the plunger is raised a certain distance by the pressure of the molten metal below it allows for the escape of the metal by a lateral port $h$, directed obliquely downward.

Each inlet disk valve is placed on its edge or periphery, with the center in line with the center of its corresponding inlet-passage, so that as the plunger is thrust down to close the port the immediate rush of metal is thrust back through said passage, and the obvious tendency of such rush of metal is to close the disk valve. Being on its edge and without means of floating away from its seat to an appreciable extent, the valve receives the full force of the rush of metal and immediately closes. It may be here mentioned that the rotating of the disk valve on its seat is caused by the rush of metal in and out. This movement, which results from the angle of the orifices or cuts on the periphery, is slight; but in working it is found to be sufficient to prevent the valve from becoming stationary in relation to its seat. The first rush of metal ejected from the inlet-port by the plunger having closed the valve, the pressure becomes more severe at the finish of the closing and then begins to exert itself upon the cushion of air within the cavity of the plunger, and this compression of air provides for the necessary excess of metal in the pump-cylinder. In this manner the plunger passes the inlet-port before its full stroke is exerted on the metal, and thus erosion is prevented at this point.

While I have described in detail but one plunger it will be seen by referring to Figs. 4, 6, and 7 of the drawings that by preference I employ four such plungers, these being operated from a common shaft *m*, having a number of cranks *n* corresponding to the number of plungers employed, and arranged at equal distances apart thereon, each plunger being connected to its crank by means of a pitman *o*.

In operation a four-cylinder pump such as I have herein shown and described will give at one point the following result: One plunger in full stroke of ejection, one plunger having just finished ejection, one plunger in full ascent for indraft, and one plunger just finishing indraft. At another stage in the operation the plunger would show the following positions: Two plungers ejecting, one of which would be at the first quarter of the beginning of its stroke and one plunger three parts through its stroke, two plungers rising for indraft, one a quarter up, forming a quarter vacuum, and the other approaching the inlet-port and having formed almost the complete vacuum before the valve has opened. The molten metal has a tendency to be sluggish, and to cause it to rush into the cylinder quickly some force must be provided, and the vacuum thus created is utilized for this purpose.

What I claim, and desire to secure by Letters Patent, is—

1. In a type-casting apparatus, the combination with a melting-pot, of a pump-cylinder provided with a reciprocating piston, having inlet and outlet ports, each provided with valves adapted to close the ports alternately, the inlet-port being located a substantial distance from the end of the cylinder, whereby the piston, after having made a stroke, on its return will create a positive vacuum below it before the inlet-port is passed and opened.

2. In a type-casting apparatus, the combination with the melting-pot, of a pump-cylinder located therein and having a passage leading from the pot into the cylinder, a peripherally-notched disk valve controlling said passage, a plunger operating in the cylinder and provided with a cavity in its operating end for the purpose specified, a nozzle for discharging the fluid metal, communicating with the interior of the cylinder, a peripherally-notched disk valve controlling the said passage, and a relief-valve communicating by a port or passage with said last-named passage, substantially as described.

3. In a type-casting apparatus, the combination with the melting-pot, of a pump-cylinder located therein and having a port or passage communicating with the pot, a disk valve controlling the flow of metal through said port or passage, an eccentrically-arranged projecting rib on said valve for the purpose specified, a plunger operating in the cylinder and provided with a cavity in its operating end, a nozzle for conducting the molten metal to the type-mold, a port or passage leading from the cylinder and communicating with said nozzle, a disk valve controlling said port or passage, an eccentrically-arranged rib on the face of said valve, and a relief-valve communicating with the port or passage leading to the nozzle, substantially as and for the purpose specified.

4. In a type-casting apparatus, the combination with the melting-pot, of a pump-cylinder located therein and having a passage communicating with the melting-pot, a disk valve controlling said passage, a plunger operating in said cylinder and having a cavity in its operating end, a nozzle communicating by a port or passage with the interior of the cylinder, a disk valve controlling said port or passage, and a relief-valve arranged in the said port or passage communicating with the nozzle, substantially as described.

5. In a type-casting apparatus, the combination with the melting-pot, of a pump-cylinder located therein and having a valve-controlled inlet-passage, a plunger operating in said cylinder, and having a cavity in its operating end, a nozzle communicating by a valve-controlled port or passage with the interior of the cylinder, and a relief-valve communicating with said last-named port or passage, said relief-valve comprising a cylinder having a lateral port and a weighted plunger operating in said cylinder, said plunger being provided with a central bore and a side port which communicate with the lateral port in the cylinder when the plunger is raised, substantially as described.

6. In a type-casting apparatus, the combination with the melting-pot, of a plurality of cylinders located therein and each having a passage leading into the pot, a disk valve controlling each passage, a plurality of plungers operating in said cylinders and each having a cavity in its lower end for the purposes specified outlet-passages for the cylinders, a nozzle for discharging the fluid metal, communicating with said outlet-passages, a disk valve controlling each outlet-passage, and a relief-valve communicating with the discharge-nozzle, substantially as described.

7. In a type-casting apparatus, the combination with the melting-pot, of a plurality of cylinders located therein and each having a passage leading into the pot, a disk valve controlling each passage, a plurality of plungers operating in said cylinder and each having a cavity in its operating end for the purpose specified, outlet-passages for the cylinders, a nozzle for discharging the fluid metal, communicating with said outlet-passages, and a disk valve controlling each outlet-passage, substantially as described.

8. In a type-casting apparatus, the combination with the melting-pot of a pump-cylinder located therein and having a passage leading from the pot into the cylinder, a valve controlling said passage, a plunger operating in the cylinder, a nozzle for discharging the fluid metal communicating with the interior of the cylinder, a valve controlling the said passage and a relief-valve communicating by a port or passage with said last-named passage, substantially as described.

9. In a type-casting apparatus, the combination with the melting-pot of a pump-cylinder located therein and having a passage leading from the pot into the cylinder, a valve controlling said passage having spiral peripheral notches, a plunger operating in the cylinder, a nozzle for discharging the fluid metal communicating with the interior of the cylinder, a valve having spiral peripheral notches controlling said passage and a relief-valve communicating by a port or passage with said last-named passage.

10. In a type-casting apparatus, the combination with the melting-pot, of a pump-cylinder located therein and having a port or passage communicating with the pot, a disk valve controlling the flow of metal through said port or passage, an eccentrically-arranged projecting rib on said valve for the purpose specified, a plunger operating in the cylinder and a nozzle for conducting the molten metal to the type-mold, a port or passage leading from the cylinder and communicating with said nozzle, a disk valve controlling said port or passage, an eccentrically-arranged rib on the face of said valve, and a relief-valve communicating with the port or passage leading to the nozzle, substantially as and for the purpose specified.

11. In a type-casting apparatus, the combination with the melting-pot, of a pump-cylinder located therein and having a passage communicating with the melting-pot, a disk valve controlling said passage, a plunger operating in said cylinder, a nozzle communicating by a port or passage with the interior of the cylinder, a disk valve controlling said port or passage, and a relief-valve arranged in said port or passage communicating with the nozzle, substantially as described.

12. In a type-casting apparatus, the combination with the melting-pot, of a pump-cylinder located therein and having a valve-controlled inlet-passage, a plunger operating in said cylinder, and a nozzle communicating by a valve-controlled port or passage with the interior of the cylinder, and a relief-valve communicating with said last-named port or passage, said relief-valve comprising a cylinder having a lateral port and a weighted plunger operating in said cylinder, said plunger being provided with a central bore and a side port which communicate with the lateral port in the cylinder when the plunger is raised, substantially as described.

13. In a type-casting apparatus, the combination with the melting-pot, of a plurality of cylinders located therein and each having a passage leading into the pot, a disk valve controlling each passage, a plurality of plungers operating in said cylinders and outlet-passages for the cylinders, a nozzle for discharging the fluid metal, communicating with said outlet-passages, a disk valve controlling each outlet-passage, and a relief-valve communicating with the discharge-nozzle, substantially as described.

14. In a type-casting apparatus, the combination with the melting-pot of a plurality of cylinders located therein and each having a passage leading into the pot, a disk valve controlling each passage, a plurality of plungers operating in said cylinders and outlet-passages for the cylinders, a nozzle for discharging the fluid metal, communicating with said outlet-passages, and a disk valve controlling each outlet-passage, substantially as described.

15. In a type-casting apparatus, the combination with a melting-pot, of a pump-cylinder located therein and having a passage leading from the pot into the cylinder, a valve controlling said passage, a plunger operating in the cylinder, a nozzle for discharging the fluid metal communicating with the interior of the cylinder, a valve controlling the said passage, and a relief-valve communicating by a port or passage with said last-named passage, said valve being so constructed as to allow a portion of the metal to pass it, substantially as described.

16. In a type-casting apparatus, the combination with a melting-pot, of a pump-cylinder located therein and having a passage leading from the pot into the cylinder, a valve controlling said passage, a plunger operating in the cylinder, a nozzle for discharging the fluid metal communicating with the interior of the cylinder, a valve controlling the said passage, and a hollow relief-valve communicating by a port or passage with said last-named passage, substantially as described.

FREDERICK WICKS.

Witnesses:
BERNARD WICKS,
NORA LESLIE PORTER.